United States Patent
Nogami et al.

(10) Patent No.: US 11,961,971 B2
(45) Date of Patent: Apr. 16, 2024

(54) PRODUCTION METHOD FOR ALL-SOLID-STATE BATTERY

(71) Applicants: MITSUBISHI GAS CHEMICAL COMPANY, INC., Tokyo (JP); NATIONAL INSTITUTE OF ADVANCED INDUSTRIAL SCIENCE AND TECHNOLOGY, Tokyo (JP)

(72) Inventors: Genki Nogami, Niigata (JP); Masahiro Shimada, Niigata (JP); Tomohiro Ito, Niigata (JP); Aki Katori, Niigata (JP); Keita Noguchi, Niigata (JP); Naoto Yamashita, Osaka (JP); Takashi Mukai, Osaka (JP); Masahiro Yanagida, Osaka (JP)

(73) Assignees: MITSUBISHI GAS CHEMICAL COMPANY, INC., Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 470 days.

(21) Appl. No.: 16/756,009

(22) PCT Filed: Oct. 12, 2018

(86) PCT No.: PCT/JP2018/038203
§ 371 (c)(1),
(2) Date: Apr. 14, 2020

(87) PCT Pub. No.: WO2019/078130
PCT Pub. Date: Apr. 25, 2019

(65) Prior Publication Data
US 2020/0303778 A1    Sep. 24, 2020

(30) Foreign Application Priority Data

Oct. 19, 2017    (JP) .................................. 2017-202610

(51) Int. Cl.
*H01M 10/0562* (2010.01)
*H01M 4/38* (2006.01)
(Continued)

(52) U.S. Cl.
CPC ......... *H01M 10/0585* (2013.01); *H01M 4/38* (2013.01); *H01M 4/483* (2013.01); *H01M 10/0562* (2013.01); *H01M 2300/0068* (2013.01)

(58) Field of Classification Search
CPC ... H01M 10/0562; H01M 4/483; H01M 10/04
See application file for complete search history.

(56) References Cited

U.S. PATENT DOCUMENTS 3,923,654 A * 12/1975 O'Hern ................ B01D 61/147
427/244
2004/0035054 A1 * 2/2004 Mohring ................ C01B 3/065
48/61

(Continued)

FOREIGN PATENT DOCUMENTS

EP    3104432 A1    12/2016
JP    2009-81106    4/2009
(Continued)

OTHER PUBLICATIONS

The extended European Search Report, EPO, Application No. 18867583.9, issued Nov. 16, 2020.
(Continued)

*Primary Examiner* — Tabassom Tadayyon Eslami
(74) *Attorney, Agent, or Firm* — GREENBLUM & BERNSTEIN, P.L.C.

(57) ABSTRACT

Provided is a production method for an all-solid-state battery having a solid electrolyte layer between a positive electrode (Continued)

layer and a negative electrode layer, the production method including: coating or impregnating the positive electrode layer and/or the negative electrode layer with a solid electrolyte solution in which a boron hydride compound serving as the solid electrolyte has been dissolved in a solvent; and removing the solvent from the coated or impregnated solid electrolyte solution and causing the solid electrolyte to precipitate on the positive electrode layer and/or the negative electrode layer.

15 Claims, 2 Drawing Sheets

(51) Int. Cl.
*H01M 4/48* (2010.01)
*H01M 10/0585* (2010.01)

(56) References Cited

U.S. PATENT DOCUMENTS

| | | | | |
|---|---|---|---|---|
| 2012/0251871 | A1* | 10/2012 | Suzuki | H01M 4/505 429/158 |
| 2015/0133569 | A1* | 5/2015 | Gong | C01B 32/174 516/38 |
| 2016/0204466 | A1 | 7/2016 | Nogami et al. | |
| 2016/0365607 | A1* | 12/2016 | Yokoyama | H01M 4/0416 |
| 2019/0036107 | A1* | 1/2019 | Nagano | H01M 4/139 |
| 2019/0319240 | A1* | 10/2019 | Chen | H01M 4/505 |

FOREIGN PATENT DOCUMENTS

| | | | |
|---|---|---|---|
| JP | 2010-56070 | * | 3/2010 |
| JP | 2011-65841 | | 3/2011 |
| JP | 2015-002080 | * | 1/2015 |
| JP | 2016-18679 | | 2/2016 |
| JP | 2017-004910 | * | 1/2017 |
| JP | 2017-4910 | | 1/2017 |
| KR | 10-2016-0048894 A | | 5/2016 |
| KR | 10-2017-0012962 A | | 2/2017 |
| WO | 2011/111495 | | 9/2011 |
| WO | 2017/130818 | * | 8/2017 |

OTHER PUBLICATIONS

Official Communication (ISR) issued in International Application No. PCT/JP2018/038203, dated Jan. 15, 2019.

* cited by examiner

PRODUCTION METHOD FOR ALL-SOLID-STATE BATTERY

TECHNICAL FIELD

The present invention relates to a method for producing an all-solid-state battery.

BACKGROUND ART

Recently, a demand for lithium ion secondary batteries has been increased in applications including portable information terminals, portable electronic equipments, electric vehicles, hybrid electric vehicles and stationary power storage systems. However, currently, a flammable organic solvent is used as an electrolytic solution in lithium ion secondary batteries, and a strong exterior is required so that an organic solvent does not leak out. Further, for example, in the case of portable personal computers, it is necessary to employ a structure against a risk at the time when an electrolytic solution leaks out. Thus, there is a limitation on structures of devices.

Moreover, the range of applications thereof has been widened to movable bodies such as vehicles and aircrafts, and a high capacity is desired for stationary lithium ion secondary batteries. Under such circumstances, importance tends to be placed on safety more than before, and efforts are concentrated on the development of an all-solid-state lithium ion secondary battery in which none of toxic substances such as organic solvents is used.

For example, use of an oxide, phosphate compound, organic polymer, sulfide, complex hydride or the like as a solid electrolyte in an all-solid-state lithium ion secondary battery has been examined.

All-solid-state batteries are broadly classified into the thin film type and the bulk type. In the case of the thin film type, interface bonding is ideally formed by utilizing gas phase film formation, but the electrode layer is thin (several μm), the electrode area is small, the amount of energy which can be stored per cell is small, and the cost is high. Therefore, it is inappropriate as a battery for large electrical storage devices or electric vehicles, wherein a large amount of energy must be stored. Meanwhile, in the case of the bulk type, the thickness of the electrode layer can be adjusted to be several tens μm to 100 μm, and it is possible to prepare an all-solid-state battery having a high energy density.

Among solid electrolytes, a sulfide solid electrolyte and a complex hydride have characteristics that they have high ion conductivity and are relatively soft, and that therefore it is easy to form the interface between solids. They are stable with respect to metal lithium and have been developed as practical solid electrolytes.

However, in methods for producing all-solid-state batteries using these solid electrolytes, all-solid-state batteries are prepared by techniques using pressing that requires a high pressure, and for this reason, the production of large electrodes is limited, and there is a problem of difficulty in interface bonding. Further, since the sulfide solid electrolyte and the complex hydride solid electrolyte are unstable against water, special environments such as an inert gas atmosphere or a dry room with a very low dew point are required, and for this reason, it has been desired that all-solid-state batteries can be produced with an apparatus which enables preparation in a small space.

With respect to the problems, it is disclosed that a surface of a positive electrode layer and a surface of a negative electrode layer to be faced to each other are coated with a solid electrolyte solution and bonded together, thereby forming a good interface with a low pressing pressure (Patent Document 1). However, the positive electrode layer and negative electrode layer themselves must be formed with a high pressing pressure, and there is a problem that when the sulfide solid electrolyte is dissolved with an alcohol solvent, the sulfide solid electrolyte is gradually decomposed to generate hydrogen sulfide.

PRIOR ART DOCUMENTS

Patent Documents

Patent Document 1: Japanese Laid-Open Patent Publication No. 2015-2080

SUMMARY OF THE INVENTION

Problems to be Solved by the Invention

Under such circumstances, it is desired to provide a method for producing an all-solid-state battery having excellent productivity.

Means for Solving the Problems

The present inventors diligently made researches in consideration of the above-described problem and obtained a finding that a good electrode layer filled with a solid electrolyte for all-solid-state batteries can be formed by impregnating an electrode layer for lithium ion batteries permeable to an electrolyte with a solid electrolyte solution, followed by removing a solvent to cause the solid electrolyte to precipitate. In addition, the present inventors obtained an unexpected finding that an all-solid-state battery having very high productivity and not requiring high press forming can be produced by applying the solid electrolyte solution to the electrode layer filled with the solid electrolyte and drying it to form a solid electrolyte and by bonding two electrode sheets obtained.

Specifically, the present invention is as described below.

<1> A method for producing an all-solid-state battery having a solid electrolyte layer between a positive electrode layer and a negative electrode layer, the method comprising:
- a step of coating or impregnating at least one of the positive electrode layer and the negative electrode layer with a solid electrolyte solution obtained by dissolving a boron hydride compound serving as a solid electrolyte in a solvent; and
- a step of removing the solvent from the coated or impregnated solid electrolyte solution and causing the solid electrolyte to precipitate on at least one of the positive electrode layer and the negative electrode layer.

<2> The method according to item <1>, wherein the step of causing the solid electrolyte to precipitate comprises forming the solid electrolyte layer on at least one of the positive electrode layer and the negative electrode layer.

<3> The method according to item <1>, which comprises a step of further coating at least one of the positive electrode layer and the negative electrode layer on which the solid electrolyte is caused to precipitate with the solid electrolyte solution, removing the solvent from the solid electrolyte solution and forming the solid electrolyte layer on at least one of the positive electrode layer and the negative electrode layer.

<4> The method according to item <1>, which comprises a step of preparing the solid electrolyte layer by impregnating a support with the solid electrolyte solution and removing the solvent from the solid electrolyte solution.

<5> The method according to any one of items <2> to <4>, which comprises a step of bonding the positive electrode layer to the negative electrode layer in a manner such that the solid electrolyte layer is positioned between the positive electrode layer and the negative electrode layer.

<6> The method according to item <5>, wherein the pressing pressure in the step of bonding the positive electrode layer to the negative electrode layer is 0.001 MPa to 10 MPa.

<7> The method according to item <2> or <3>, wherein at least one of the positive electrode layer and the negative electrode layer on which the solid electrolyte layer is formed is formed without pressing.

<8> The method according to any one of items <1> to <7>, wherein the boron hydride compound comprises at least one selected from the group consisting of $LiBH_4$, an $LiBH_4$—LiI-based material, $3LiBH_4$—LiI, an $LiBH_4$—$P_2S_5$-based material, $9LiBH_4$—$P_2S_5$, an $LiBH_4$—$P_2I_4$-based material, $9LiBH_4$—$P_2I_4$, $85LiBH_4$-$15P_2I_4$, $Li_2Bi_2H_{12}$, $Li_2B_{10}H_{10}$, $LiCB_{11}H_{12}$ and $LiCB_9H_{10}$.

<9> The method according to item <8>, wherein the boron hydride compound comprises $LiBH_4$.

<10> The method according to any one of items <1> to <9>, wherein the solvent comprises at least one selected from the group consisting of $H_2O$, an alcohol-based solvent, an ether-based solvent and a nitrile-based solvent.

<11> The method according to item <10>, wherein the solvent comprises at least one selected from the group consisting of tetrahydrofuran and acetonitrile.

<12> The method according to any one of items <1> to <11>, wherein the positive electrode layer contains a positive electrode active material, and wherein the electric potential of the positive electrode active material with reference to lithium is 3.0 V or less.

<13> The method according to any one of items <1> to <12>, wherein the positive electrode layer contains a sulfur-based positive electrode active material.

<14> The method according to any one of items <1> to <13>, wherein the negative electrode layer contains at least one selected from the group consisting of silicon, tin, a silicon-containing compound and a tin-containing compound as a negative electrode active material.

<15> The method according to item <14>, wherein SiO is contained as the negative electrode active material.

<16> A method for producing an all-solid-state battery having a solid electrolyte layer between a positive electrode layer and a negative electrode layer, the method comprising:
a step of coating or impregnating at least one of the positive electrode layer and the negative electrode layer with a molten salt obtained by melting a boron hydride compound serving as a solid electrolyte; and
a step of cooling the molten salt and causing the solid electrolyte to precipitate on at least one of the positive electrode layer and the negative electrode layer.

Advantageous Effect of the Invention

According to the present invention, it is possible to provide a method for producing an all-solid-state battery. Further, according to the present invention, since a high pressing pressure is not required, it is possible to provide a method for producing an all-solid-state battery, which has high productivity and can be applied to mass production.

EMBODIMENTS FOR CARRYING OUT THE INVENTION

Hereinafter, the method for producing the all-solid-state battery of the present invention will be specifically described. Note that materials, constitutions, etc. described below do not limit the present invention and can be modified variously within the range of the gist of the present invention. In this specification, when a numerical range is shown using "-", the range includes numerical values at the both sides of "-".

<Electrode Sheet>

Figure 1:
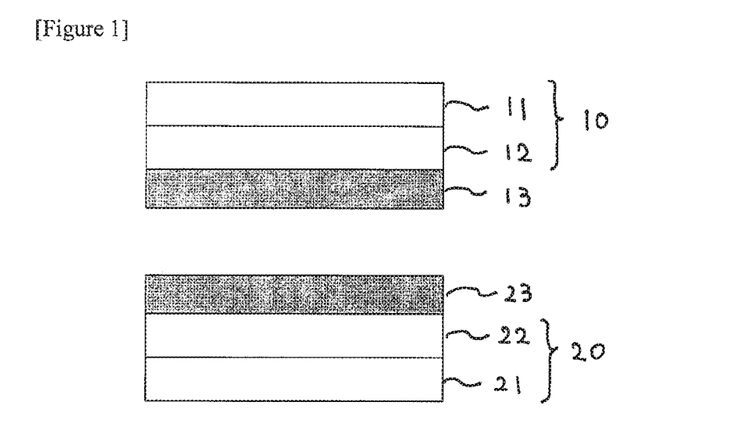
FIG. 1 is a schematic view showing an example of the layer structure of the all-solid-state battery of the present invention.

An example of the layer structure of the all-solid-state battery of the present invention will be described using FIG. 1.

An electrode sheet 10 to be used in the present invention is also referred to as a "positive electrode sheet" and has a positive electrode layer 12 on a current collector 11. On the positive electrode layer 12, a solid electrolyte layer 13 is formed.

An electrode sheet 20 to be used in the present invention is also referred to as a "negative electrode sheet" and has a negative electrode layer 22 on a current collector 21. On the negative electrode layer 22, a solid electrolyte layer 23 is formed.

Further, the positive electrode layer 12 is bonded to the negative electrode layer 22 in a manner such that the solid electrolyte layers 13 and 23 are positioned between the positive electrode layer 12 and the negative electrode layer 22, thereby preparing an all-solid-state battery according to one embodiment of the present invention.

Note that the positive electrode layer and the negative electrode layer are collectively referred to as the electrode layer.

As the electrode layer to be used in the present invention, it is possible to use an electrode layer for lithium-ion batteries using an electrolyte. As described above, in the structure of a general electrode sheet, an electrode layer is formed on a current collector. The positive electrode layer is usually formed with a positive electrode active material, a binder and a conduction assisting agent, and the negative electrode layer is usually formed with a negative electrode active material, a binder and a conduction assisting agent. These electrode layers have a void and can be impregnated with an electrolyte. Note that it is possible to employ a constitution in which a metal foil or alloy foil is used for either the positive electrode layer or the negative electrode layer and the electrode sheet produced in the present invention is used for the other electrode.

As the current collector, in general, a stainless steel foil or aluminum foil is used for the positive electrode layer, and a stainless steel foil or copper foil is used for the negative electrode layer. Note that a current collector whose surface is carbon-coated can also be used.

The positive electrode active material to be contained in the positive electrode layer is not particularly limited as long as it is a material which can release lithium ions at the time of charging and can absorb lithium ions at the time of discharging. Examples thereof include a metal oxide having a transition metal, a sulfur-based positive electrode active material, an organic positive electrode active material, and $FeF_3$ and $VF_3$ utilizing a conversion reaction. In the present invention, the electric potential of the positive electrode active material with reference to lithium is preferably 3.0 V or less because in this case, a reaction between an active material and a boron hydride compound-based solid electrolyte interface is suppressed, resulting in smaller interface resistance. The electric potential of the positive electrode active material with reference to lithium is more preferably 1.0-2.7 V.

As the metal oxide having a transition metal, it is possible to use particles or a thin film of a metal oxide containing lithium and at least one of Mn, Co, Ni, Fe, Cr and V that are transition metals. Specific examples thereof include, but are not particularly limited to, $LiCoO_2$, $LiCo_2O_4$, $LiMnO_2$, $LiMn_2O_4$, $LiMnCoO_4$, $Li_2MnCoO_4$, $LiNi_{0.8}Co_{0.15}Al_{0.05}O_2$, $LiNi_{0.05}Mn_{0.5}O_2$, $Li_2NiMn_3O_8$, $LiVO_2$, $LiV_3O_3$, $LiCrO_2$, $LiFePO_4$, $LiCoPO_4$, $LiMnPO_4$, $LiVOPO_4$, $LiNiO_2$, $LiNi_2O_4$, $LiNi_{1/3}Co_{1/3}Mn_{1/3}O_2$, $Li_2FeSiO_4$, $Li_2MnSiO_4$ and $LiFeBO_3$. Further, $Fe_2O_3$, $Cr_3O_8$, $V_2O_5$, $MnO_2$, etc. can also be used. Among them, $LiCoO_2$, $LiMnO_2$, $LiMn_2O_4$, $LiNi_{0.8}Co_{0.15}Al_{0.05}O_2$, $LiNi_{0.5}Mn_{0.5}O_2$, $Li_2NiMn_3O_8$, $LiFePO_4$, $LiCoPO_4$, $LiMnPO_4$, $LiVOPO_4$, $LiNiO_2$ and $LiNi_{1/3}Co_{1/3}Mn_{1/3}O_2$ are preferred.

Regarding these positive electrode active materials, it is possible to provide a coating layer to the particles or thin film of the positive electrode active materials for the purpose of suppressing a reaction with a solid electrolyte. Examples of the coating layer include $LiNbO_3$, $Li_4Ti_5O_{12}$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$ and $LiBO_2$.

Specific examples of the sulfur-based positive electrode active material include, but are not particularly limited to, S, a sulfur-carbon composite, $TiS_2$, $TiS_3$, $TiS_4$, $NiS_2$, $NiS_2$, CuS, $FeS_2$, $Li_2S$, $MoS_3$, a sulfur-modified polyacrylonitrile, rubeanic acid (dithiooxamide) and a disulfide compound. Among them, $TiS_2$, $TS_3$, $TiS_4$, NiS, $NiS_2$, $FeS_2$, $Li_2S$, $MoS_3$, a sulfur-modified polyacrylonitrile, a sulfur-carbon composite and rubeanic acid (dithiooxamide) are preferred.

Specific examples of the organic positive electrode active material include, but are not particularly limited to, a radical compound typified by 2,2,6,6-tetramethylpiperidinoxyl-4-ylmethacrylate and polytetramethylpiperidinoxy vinyl ether, a quinone compound, a radialene compound, tetracyanoquinodimethane and phenazine oxide. Among them, a radical compound and a quinone compound are preferred because these compounds have a large theoretical capacity and can maintain a discharge capacity at a relatively good level.

As the above-described positive electrode active material, an optimum material may be selected depending on the type of the solid electrolyte for impregnation. For example, when using $LiBH_4$ having low oxidation resistance as the main component of the solid electrolyte, it is preferred to use a sulfur-based positive electrode active material which is an active material having a low equilibrium potential. As the sulfur-based positive electrode active material, for example, a sulfur-modified polyacrylonitrile typified by the compound described in WO2010/044437 and a sulfur-carbon composite typified by those described in WO2015/030053, Japanese Laid-Open Patent Publication No. 2015-92449 and WO2015/030053 can be used. When using a higher-order borane compound having high withstand voltage such as $Li_2B_{12}H_{12}$ as the main component of the solid electrolyte, in addition to the above-described sulfur-based positive electrode active material, a metal oxide having a transition metal which is an active material having a high equilibrium potential can also be used. When using a positive electrode active material having a high equilibrium potential, a battery voltage per cell can be increased.

As the negative electrode active material to be contained in the negative electrode layer, for example, a metal active material and a carbon-based active material can be used. Examples of the metal active material include $Li_4Ti_5O_{12}$, Li, In, Al, Si, SiO, Sn and alloys of these metals. Examples of the carbon-based active material include mesocarbon microbeads (MCMB), a highly oriented graphite (HOPG), a hard carbon and a soft carbon. In particular, it is preferred to use an active material having a lower equilibrium potential as the negative electrode because the energy density of the battery is improved to increase the operating voltage. Examples of such negative electrode active materials include Li, a carbon-based active material, Si and SiO.

The binder to be used for the positive electrode layer is not particularly limited, but for example, a polyimide-based material, an acrylic material, polysiloxane, polyalkylene glycol, polyvinylidene fluoride (PVdF), polytetrafluoroethylene (PTFE), ethylene-vinyl alcohol copolymer (EVOII), etc. can be used. According to need, a thickener such as carboxymethyl cellulose (CMC) can also be used.

The binder to be used for the negative electrode layer is not particularly limited, but for example, a polyimide-based material, polysiloxane, polyalkylene glycol, polyvinylidene fluoride (PVdF), polytetrafluoroethylene (PTFE), styrene-butadiene rubber (SBR), an acrylic material, etc. can be used. According to need, a thickener such as carboxymethyl cellulose (CMC) can also be used.

The conduction assisting agent to be used for the electrode layer is not particularly limited as long as it has desired conductivity. Examples thereof include a conduction assisting agent made of a carbon material. Specific examples thereof include carbon black, acetylene black, Ketjen black and carbon fiber.

As the method for preparing the electrode sheet, a publicly-known method can be used. For example, the positive electrode active material or negative electrode active material is mixed with the binder, the conduction assisting agent and an organic solvent to prepare a coating solution. The current collector is coated with the coating solution using the doctor blade method, spin coating method, spray coating method or the like, followed by drying, thereby preparing the electrode sheet, wherein the electrode layer is formed on the current collector.

<Lithium Doping>

In the case where none of the positive electrode layer and the negative electrode layer contains Li as the active material, for example, in the case where the sulfur-based positive electrode active material is used for the positive electrode layer and Si, SiO or the carbon-based active material is used for negative electrode layer, one of the active materials must be lithium-doped. Lithium doping is carried out, for example, by assembling an electrolyte-based battery as described in WO2015/152214. When producing an all-solid-state battery using an electrolyte-based electrode sheet as in the case of the present invention, lithium doping can be carried out according to an existing method. The interfaces between the positive electrode layer, the solid electrolyte layer and the negative electrode layer in the all-solid-state battery must be firmly bonded. It is extremely difficult to carry out lithium doping in the form of the all-solid-state battery and to disassemble the battery to take out each electrode sheet. Therefore, in the case where the all-solidstate battery is produced using a combination of active materials, wherein none of the active materials of the positive electrode layer and the negative electrode layer contains Li, a production method utilizing an electrode sheet usable in the electrolyte system is significantly advantageous.

As the method of lithium doping, a publicly-known method can be used. For example, lithium doping may be carried out according to an electrochemical method in which a metal lithium foil is used for a counter electrode to prepare a battery, or a chemical method in which a metal hydride such as metal lithium, alkyllithium, $LiAlH_4$ and $LiBH_4$ is directly brought into contact with the electrode sheet to perform a reaction. When lithium doping is carried out according to the chemical method, it can be applied to the electrode sheet or the active material. Among these techniques, an electrochemical technique is more excellent because the amount of lithium doping can be comprehended by measuring the amount of a current flowed or the electric potential of the lithium-doped electrode layer.

<Solid Electrolyte Solution>

As the solid electrolyte solution to be used in the present invention, a product obtained by dissolving a boron hydride compound serving as the solid electrolyte in a solvent can be used.

As the solid electrolyte to be dissolved in the solvent, the boron hydride compound can be used without particular limitation, but it is preferably a Li-containing boron hydride compound, and examples thereof include $LiBH_4$, a $LiBH_4$—LiI-based material, $3LiBH_4$—LiI, a $LiBH_4$—$P_2S_5$-based material, $9LiBH_4$—$P_2S_5$, a $LiBH_4$—$P_2I_4$-based material, $9LiBH_4$—$P_2I_4$, $85LiBH_4$-$15P_{24}$, $Li_2B_{12}H_{12}$, $Li_2B_{10}H_{10}$, $LiCB_{11}H_{12}$ and $LiCB_9H_{10}$. The $LiBH_4$—LiI-based material means a solid solution with a molar ratio of $LiBH_4/LiI=0.8$-5. The $LiBH_4$—$P_2S_5$-based material means a crystal synthesized with a feed molar ratio of $LiBH_4/P_2S_5=5.6$-49. The $LiBH_4$—$P_2I_4$-based material means a crystal synthesized with a feed molar ratio of $LiBH_4/P_2I_4=4$-99.

The solvent is not particularly limited as long as the solid electrolyte can be dissolved therein, but it is preferably a material that does not react with the solid electrolyte. For $LiBH_4$-based materials, an ether-based solvent such as tetrahydrofuran, 2-methyltetrahydrofuran, 1,2-dimethoxyethane and diethylene glycol dimethyl ether, a nitrile-based solvent such as propanenitrile and acetonitrile; and an amide-based solvent such as N,N-dimethylformamide and N,N-dimethylacetamide are more preferred, and these materials may be used solely or in combination. Even more preferred are tetrahydrofuran, 2-methyltetrahydrofuran, 1,2-dimethoxyethane, diethylene glycol dimethyl ether and acetonitrile, and particularly preferred are tetrahydrofuran and acetonitrile.

For higher-order boron hydride compounds such as $Li_2B_{12}H_{12}$, it is possible to use various materials including: $H_2O$; an alcohol-based solvent such as methanol, ethanol, propanol and butanol; an ether-based solvent such as tetrahydrofuran, 2-methyltetrahydrofuran, 1,2-dimethoxyethane and diethylene glycol dimethyl ether; acetonitrile; an acid ester-based solvent such as ethyl acetate and methyl acetate; an amide-based solvent such as N,N-dimethylformamide and N,N-dimethylacetamide; and a ketone-based solvent, and these materials may be used solely or in combination. Among them, $H_2O$, an alcohol-based solvent and acetonitrile are preferred in consideration of the solubility, viscosity, evaporation rate, safety of solvent and suppressing side reactions.

When $LiBH_4$ is contained, since dissolution is easily performed by $H_2O$, it is preferred to sufficiently remove the moisture in the solvent. The moisture concentration is preferably 50 ppm or less, and more preferably 15 ppm or less. Meanwhile, since the higher-order boron hydride compound is stable even in $H_2O$ at room temperature, it can be used even when the moisture content in the solvent is relatively high.

The concentration of the solid electrolyte in the solid electrolyte solution is generally adjusted to 1-40 wt % so that the optimum viscosity can be obtained at the time of impregnation later, though the optimum value varies depending on the types of the solid electrolyte and the solvent. When the concentration is lower than this range, the efficiency of precipitation of the solid electrolyte is deteriorated. When the concentration is higher, the viscosity increases, and due to this, impregnation to the bottoms of pores may become more difficult. The concentration of the solid electrolyte in the solid electrolyte solution is preferably 3-25 wt %/o.

<Solid Electrolyte Molten Salt>

In the present invention, it is possible to use a molten salt obtained by melting a boron hydride compound having a low melting point instead of the above-described solid electrolyte solution. As a boron hydride compound having a relatively low melting point, a Li-containing boron hydride compound is preferred, and examples thereof include $LiBH_4$—$LiNH_2$ which has a melting point of 95-105° C. The range of the melting point is preferably 80-250° C. When the range is lower than that, the solid electrolyte is melted due to increase in the battery temperature, and it may cause a short circuit. When the temperature is higher than the range, a high-temperature molten salt may react with the active material of the electrode layer, the carbon material and the current collector. At the time of impregnation into the electrode layer, a solid electrolyte solution having a low viscosity more easily enters to the bottoms of pores of the electrode layer. For this reason, it is preferred to use the solid electrolyte solution whose viscosity can be easily adjusted by changing its concentration.

<Impregnation with Solid Electrolyte Solution or Solid Electrolyte Molten Salt>

As the method for impregnating the electrode sheet with the solid electrolyte solution, a publicly-known method for impregnating an electrode sheet with an electrolyte can be used. In particular, for impregnation to the bottoms of pores of the electrode layer, vacuum impregnation is preferred. Further, when heating, the viscosity of the solution is decreased, and therefore impregnation to the bottoms of pores can be carried out more efficiently.

As the method for impregnating the electrode sheet with the solid electrolyte molten salt, impregnation is carried out in a heated state where the temperature is equal to or higher than the melting point of the solid electrolyte, and the temperature range may be 80-300° C. When impregnation is carried out at a temperature higher than that, the active material may react with the molten salt. Further, for impregnation to the bottoms of pores of the electrode layer, vacuum impregnation is preferred.

<Precipitation of Solid Electrolyte to Voids of Electrode Layer>

After the electrode layer is impregnated with the solid electrolyte solution, the solvent is removed to cause the solid electrolyte to precipitate, and voids of the electrode layer are densely filled with the solid electrolyte. In the case of impregnation with the solid electrolyte molten salt obtained by melting the solid electrolyte having a low melting point, the temperature is decreased to the melting point or lower to cause the solid electrolyte to precipitate. In the case of using the solid electrolyte solution obtained by dissolving the solid electrolyte in the solvent, the solvent is volatilized to cause the solid electrolyte to precipitate. It is preferred to perform heating in order to promote volatilization of the solvent. The temperature for heating varies depending on the type of the solvent, but it may be 50-200° C. When the solvent is volatilized at a temperature higher than this range, there is concern that the solid electrolyte may not precipitate densely due to occurring of a side reaction or foaming of the solvent. Further, by heating under an inert gas stream or under vacuum, volatilization of the solvent can be promoted.

The electrode sheet filled with the solid electrolyte after drying is subjected to rolling, thereby more densifying the electrode layer. The method of rolling is not particularly limited, but it is preferred to use the roll pressing method which is used for preparing electrode sheets of lithium ion batteries. The roll pressing method has high continuous productivity, but the pressing pressure in this case is lower than those of the uniaxial pressing method and isostatic pressing method. The pressing pressure in this case is preferably 0.1-100 MPa, and more preferably 1-80 MPa. For forming conventional all-solid-state batteries, very high pressing pressures are required in order to deform and densify powder itself, but in the present invention, since the solid electrolyte is formed densely in the voids of the electrode layer by causing the solid electrolyte to precipitate from the solid electrolyte solution, it is not required to apply a high pressing pressure such as 300 MPa that deforms particles. In the present invention, the purpose of rolling after drying is to fill small cracks generated by expansion/shrinkage due to thermal change and small voids generated at the time of volatilization of the solvent, and sufficient effects can be obtained by the roll pressing method.

Unlike Patent Document 1 (Japanese Laid-Open Patent Publication No. 2015-2080), the present invention has the advantage that the positive electrode layer and negative electrode layer whose pores are filled with the solid electrolyte can be formed without pressing.

<Formation of Solid Electrolyte Layer>

The surface of the electrode layer whose pores are filled with the solid electrolyte is coated with the solid electrolyte solution described in <Solid electrolyte solution>, and then the solvent is removed to cause the solid electrolyte to precipitate, thereby forming the solid electrolyte layer. Alternatively, the surface of the electrode layer whose pores are filled with the solid electrolyte is coated with the solid electrolyte molten salt described in <Solid electrolyte molten salt>, and then the molten salt is cooled to cause the solid electrolyte to precipitate, thereby forming the solid electrolyte layer. Coating can be carried out according to a publicly-known method, and examples thereof include the doctor blade method, the spin coating method and the spray coating method. Drying can be carried out according to a method similar to that described in <Precipitation of solid electrolyte to voids of electrode layer>. By coating the surface of the electrode layer with the solid electrolyte solution or solid electrolyte molten salt at the time of <Impregnation with solid electrolyte solution or solid electrolyte molten salt>, <Precipitation of solid electrolyte to voids of electrode layer> and <Formation of solid electrolyte layer> can be carried out simultaneously.

When the solid electrolyte layer formed on the positive electrode sheet is too thin, a short circuit may be caused, and when the layer is too thick, the resistance is increased. From this viewpoint, the thickness of the solid electrolyte layer is preferably 1-300 µm, and more preferably 5-100 µm.

When the solid electrolyte layer formed on the negative electrode sheet is too thin, a short circuit may be caused, and when the layer is too thick, the resistance is increased. From this viewpoint, the thickness of the solid electrolyte layer is preferably 1-300 µm, and more preferably 5-100 µm.

Further, the solid electrolyte layer can be formed independently. In this case, a support into which solutions can permeate is impregnated with the solid electrolyte solution, and the solvent is removed to cause the solid electrolyte to precipitate. Since the solid electrolyte layer plays a role as a separator between the positive electrode layer and the negative electrode layer, the support is required to have high insulation properties, and though there is no particular limitation, it is possible to use a separator to be used for electrolytes. Examples thereof include a glass fiber filter, a polyolefin-based separator, a cellulose-based separator and a non-woven fabric-based separator. Among them, preferred are a glass fiber filter and non-woven fabric, which have a high ratio of voids in the separator and high heat resistance. This is because, since the solid electrolyte is formed in void portions, the ratio of the solid electrolyte serving as the ion conductor is increased. Further, in the case of a polyolefin-based separator having the shutdown function, by heating at the time of <Precipitation of solid electrolyte to voids of electrode layer>, the shutdown function is actuated, and the number of voids in which the solid electrolyte precipitates may be more decreased. As the impregnation method and the method for precipitation of the solid electrolyte, methods similar to those respectively described in <Impregnation with solid electrolyte solution or solid electrolyte molten salt> and <Precipitation of solid electrolyte to voids of electrode layer> can be conducted. In such a manner, a solid electrolyte layer sheet can be prepared independently. The thickness of the solid electrolyte sheet is preferably 1-300 µm, and more preferably 5-100 µm.

After the solid electrolyte is precipitated by drying, the solid electrolyte layer is densified by rolling. The rolling method is not particularly limited, but it is preferred to employ the roll pressing method which has excellent productivity. Since the solid electrolyte layer obtained by causing the solid electrolyte to precipitate from the solid electrolyte solution is relatively dense and the boron hydride compound is soft, the solid electrolyte layer can be sufficiently densified by rolling with a low pressing pressure. The pressing pressure in this case is preferably 0.1-100 MPa, and more preferably 1-80 MPa.

<Preparation of all-Solid-State Battery>

The all-solid-state battery can be prepared by layering respective sheets, followed by rolling.

In the present invention, it is preferred to include a step of bonding the positive electrode layer to the negative electrode layer in a manner such that the solid electrolyte layer is positioned between the positive electrode layer and the negative electrode layer. The pressing pressure for bonding the positive electrode layer to the negative electrode layer is preferably 0.0001-100 MPa, more preferably 0.0005-20 MPa, and particularly preferably 0.001-10 MPa.

As the combination of respective sheets, any of the following combinations can be employed: (1) a sheet obtained by forming the solid electrolyte layer on the positive electrode sheet+the negative electrode sheet; (2) a sheet obtained by forming the solid electrolyte layer on the negative electrode sheet+the positive electrode sheet; (3) a sheet obtained by forming the solid electrolyte layer on the positive electrode sheet+a sheet obtained by forming the solid electrolyte layer on the negative electrode sheet; and (4) the positive electrode sheet+the solid electrolyte layer sheet+the negative electrode sheet. The boron hydride compound has an ability as a binder, and therefore has a high effect of bonding these sheets. As the rolling method, for example, the roll pressing method can be employed.

EXAMPLES

Hereinafter, the embodiments of the present invention will be more specifically described by way of examples, but the embodiments are not limited to the examples.

Example 1

<Method for Producing Sulfur-Based Positive Electrode Active Material>

With 100 parts by weight of a high cis butadiene rubber (UBEPOL (registered trademark) BR150L manufactured by Ube Industries, Ltd., cis-1,4 bond content: 98%), 1000 parts by weight of sulfur (colloidal sulfur manufactured by Tsurumi Chemical industry Co., Ltd.), 25 parts by weight of a vulcanization accelerator (zinc diethyldithiocarbamate: NOCCELER (registered trademark) EZ manufactured by Ouchi Shinko Chemical Industrial Co., Ltd.) and 20 parts by weight of acetylene black (DENKA BLACK manufactured by Denki Kagaku Kogyo K.K.) were blended, and the mixture was kneaded using a kneading test apparatus. This was heated to 450° C. under argon atmosphere at a temperature raising rate of 5° C./min, and after that, it was kept at 450° C. for 2 hours and then naturally cooled. During this, sulfur was set to be under a refluxed condition, and a slight amount of argon was flowed in order to remove a gas generated. After that, it was kept at 250° C. for 3 hours under vacuum conditions and the remaining sulfur was removed, thereby obtaining a sulfur-based positive electrode active material.

<Method for Producing Positive Electrode Slurry>

Weighing was carried out so that the weight ratio of the above-described sulfur-based positive electrode active material obtained: acetylene black:VGCF:acrylic binder became 87:2:8:3, water was moderately added to the mixture and it was kneaded by a kneading machine, thereby obtaining a positive electrode slurry. Note that VGCF is a registered trademark of Showa Denko K.K. and it is a vapor grown carbon fiber.

<Method for Producing Negative Electrode Slurry>

Weighing was carried out so that the weight ratio of SiO:acetylene black:polyimide binder became 80:5:15, N-methylpyrrolidone was moderately added to the mixture and it was kneaded by a kneading machine, thereby obtaining a negative electrode slurry.

<Preparation of Electrode Sheets>

A current collector (carbon-coated aluminum foil having a thickness of 15 μm) was coated with the above-described positive electrode slurry obtained, and a current collector (SUS foil having a thickness of 10 μm) was coated with the above-described negative electrode slurry obtained, respectively using a desk-top coating machine (manufactured by Tester Sangyo Co., Ltd., FILM COATER: PI1210), and these were preliminarily dried at 80° C. for 10 minutes using a hot-air dryer. Each electrode sheet after preliminarily dried was put into a glass tube to perform evacuation, and using a glass tube oven, the positive electrode sheet was vacuum dried at 160° C. for 12 hours and the negative electrode sheet was vacuum dried at 300° C. for 12 hours. After that, the positive electrode sheet was punched into a disk shape having a diameter of 11 mm and the negative electrode sheet was punched into a disk shape having a diameter of 12 mm to obtain electrode sheets. The capacity density of the positive electrode sheet was 1.0 mAh/cm$^2$, and the capacity density of the negative electrode sheet was 3.0 mAh/cm$^2$.

<Lithium Doping to Negative Electrode Sheet>

A CR2032 type coin cell was prepared by using the above-described negative electrode sheet prepared as a test electrode, a metal lithium foil having a diameter of 14 mm as a counter electrode, a glass fiber filter (manufactured by Advantech Co., Ltd., GA-100, thickness: 500 μm) having a diameter of 16 mm as a separator and 1M LiPF$_6$ ethylene carbonate/diethyl carbonate (=1/1, vol/vol) as an electrolyte. Note that all the operations were carried out in a dry room (room temperature: 20° C., room dew point: −65° C.).

Next, the negative electrode sheet was lithium-doped using a charge/discharge test apparatus. Discharge (Li insertion) was performed at 30° C. with a current of 0.3 mA until the voltage became 0.001 V, and after a 10-minute pause, charge (Li removal) was performed with a current of 0.3 mA until the voltage became 1.0 V. After that, discharge (Li insertion) was performed again with a current of 0.3 mA until the voltage became 0.001 V, and thus the negative electrode sheet was lithium-doped.

<Formation of Solid Electrolyte Layer>

The CR2032 type coin cell after lithium-doping was disassembled to take out the negative electrode sheet, and the surface of the electrode sheet was washed with dimethyl carbonate and then naturally dried. The surface of the electrode layer of each electrode sheet was coated with 3LiBH$_4$—LiI/tetrahydrofuran solution (solid content: 25% by weight, hereinafter referred to as the "solid electrolyte solution"), it was put into an acrylic vacuum vessel to perform evacuation, and it was allowed to stand for 1 hour to impregnate the electrode layer with the solid electrolyte solution. After that, the electrode sheet was taken out from the acrylic vacuum vessel and preliminarily dried on a hot plate at 60° C. for 2 hours. Note that all the operations were carried out in a dry room (room temperature: 20° C., room dew point: −65° C.).

Each electrode sheet after preliminarily dried was put into a glass tube, and using a glass tube oven, it was vacuum dried at 80° C. for 15 hours. After that, in the dry room, the electrode sheet was taken out from the glass tube, and it was made smooth by cold pressing under 2 MPa using a uniaxial pressing machine, thereby obtaining each electrode sheet, wherein the solid electrolyte layer was formed in the inside and on the surface of the electrode layer.

The weight and the thickness of the solid electrolyte layer formed in each electrode sheet are shown in Table 1. The weight means the total weight of the solid electrolyte formed in the inside and on the surface of the electrode sheet, and the thickness means the thickness of the solid electrolyte layer formed on the surface of the electrode sheet.

TABLE 1

Weight and thickness of solid electrolyte formed in each electrode sheet

| Electrodes | Solid electrolyte layer | |
| --- | --- | --- |
| | Thickness | Weight |
| Sulfur-based rubber positive electrode | 44 μm | 5.8 mg/cm$^2$ |
| SiO negative electrode | 82 μm | 10.9 mg/cm$^2$ |

<Preparation of all-Solid-State Battery>

A CR2032 type coin cell was prepared by combining the positive electrode sheet and the negative electrode sheet obtained above. Specifically, the sulfur-based positive electrode sheet and the SiO negative electrode sheet were layered in a manner such that the electrode layer surface of the positive electrode sheet and the electrode layer surface of the negative electrode sheet were opposed to each other. At the time of layering, the electrode sheets were successfully bonded together only by the pressure of a disc spring set in the coin cell without particular pressing.

<Charge and Discharge Test>

Figure 2:
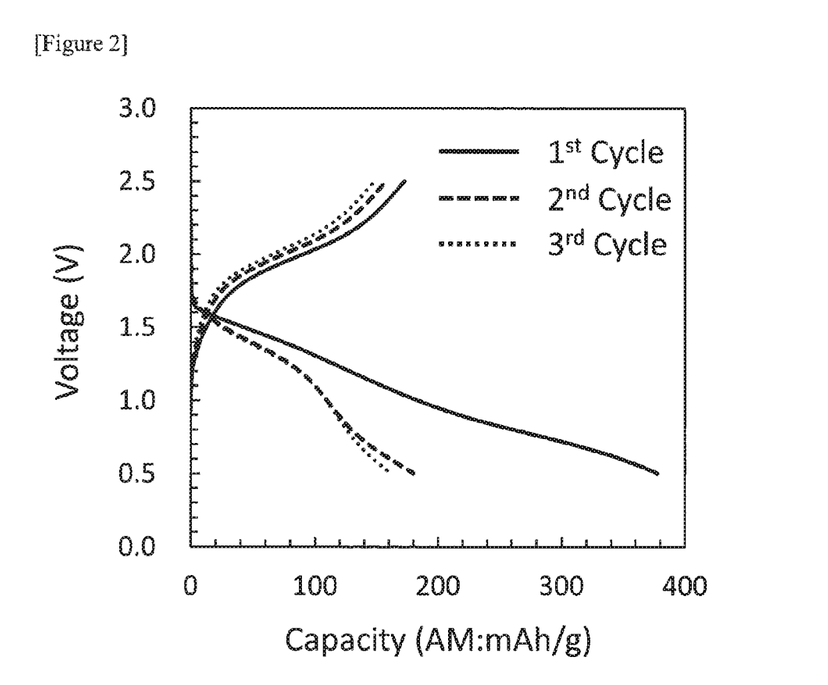
FIG. 2 shows charging and discharging curves of the all-solid-state battery prepared in Example 1.

Using the obtained all-solid-state battery, a constant current charge and discharge test was conducted with an environmental temperature of 90° C., a charge/discharge current of 0.1 mA and an operating voltage range of 0.5-2.5 V. The discharge capacity of the first time was 377 mAh/g (converted to the capacity per weight of the positive electrode sheet), and the charge capacity was 173 mAh/g (converted to the capacity per weight of the positive electrode sheet). Charging and discharging curves of the prepared all-solid-state battery were shown in FIG. 2. It is understood from FIG. 2 that the prepared all-solid-state battery can perform charge/discharge stably in the second cycle or later.

Example 2

<Method for Producing Positive Electrode Slurry>

Weighing was carried out so that the weight ratio of the sulfur-based positive electrode active material obtained in Example 1:acetylene black:acrylic binder became 90:5:5, water was moderately added to the mixture and it was kneaded by a kneading machine, thereby obtaining a positive electrode slurry.

<Method for Producing Negative Electrode Slurry>

Weighing was carried out so that the weight ratio of SiO:acetylene black:VGCF:polyimide binder became 77:4:1:18, N-methylpyrrolidone was moderately added to the mixture and it was kneaded by a kneading machine, thereby obtaining a negative electrode slurry. Note that VGCF is a registered trademark of Showa Denko K.K. and it is a vapor grown carbon fiber.

<Preparation of Electrode Sheets>

A current collector (carbon-coated aluminum foil having a thickness of 15 μm) was coated with the above-described positive electrode slurry obtained, and a current collector (SUS foil having a thickness of 10 μm) was coated with the above-described negative electrode slurry obtained, respectively using a desk-top coating machine (manufactured by Tester Sangyo Co., Ltd., FILM COATER: PI1210), and these were preliminarily dried at 80° C. for 10 minutes using a hot-air dryer. Each electrode sheet after preliminarily dried was put into a glass tube to perform evacuation, and using a glass tube oven, the positive electrode sheet was vacuum dried at 150° C. for 10 hours and the negative electrode sheet was vacuum dried at 300° C. for 10 hours. After that, the positive electrode sheet was punched into a disk shape having a diameter of 11 mm and the negative electrode sheet was punched into a disk shape having a diameter of 11 mm to obtain electrode sheets. The capacity density of the positive electrode sheet was 0.51 mAh/cm$^2$, and the capacity density of the negative electrode sheet was 1.0 mAh/cm$^2$.

<Lithium Doping to Negative Electrode Sheet>

A CR2032 type coin cell was prepared by using the above-described negative electrode sheet prepared as a test electrode, a metal lithium foil having a diameter of 14 mm as a counter electrode, a glass fiber filter (manufactured by Advantech Co., Ltd., GA-100, thickness: 500 μm) having a diameter of 16 mm as a separator and 1M LiPF$_6$ ethylene carbonate/diethyl carbonate (=1/1, vol/vol) as an electrolyte. Note that all the operations were carried out in a dry room (room temperature: 20° C., room dew point: −65° C.).

Next, the negative electrode sheet was lithium-doped using a charge/discharge test apparatus. Discharge (Li insertion) was performed at 30° C. with a current of 0.3 mA until the voltage became 0.001 V, and after a 10-minute pause, charge (Li removal) was performed with a current of 0.3 mA until the voltage became 1.0 V. After that, discharge (Li insertion) was performed again with a current of 0.3 mA until the voltage became 0.001 V, and thus the negative electrode sheet was lithium-doped.

<Formation of Solid Electrolyte Layer>

The CR2032 type coin cell after lithium-doping was disassembled to take out the negative electrode sheet, and the surface of the electrode sheet was washed with dimethyl carbonate and then naturally dried. The surface of the electrode layer of each electrode sheet was coated with 3LiBH$_4$—LiI/tetrahydrofuran solution (solid content: 25% by weight, hereinafter referred to as the "solid electrolyte solution"), it was put into an acrylic vacuum vessel to perform evacuation, and it was allowed to stand for 1 hour to impregnate the electrode layer with the solid electrolyte solution. After that, the electrode sheet was taken out from the acrylic vacuum vessel and preliminarily dried on a hot plate at 60° C. for 2 hours. Note that all the operations were carried out in a dry room (room temperature: 20° C., room dew point: −65° C.).

Each electrode sheet after preliminarily dried was put into a glass tube, and using a glass tube oven, it was vacuum dried at 150° C. for 10 hours. After that, in the dry room, the electrode sheet was taken out from the glass tube, and it was made smooth by cold pressing under 2 MPa using a uniaxial pressing machine, thereby obtaining each electrode sheet, wherein the solid electrolyte layer was formed in the inside and on the surface of the electrode layer.

The weight and the thickness of the solid electrolyte layer formed in each electrode sheet are shown in Table 2. The weight means the total weight of the solid electrolyte formed in the inside and on the surface of the electrode sheet, and the thickness means the thickness of the solid electrolyte layer formed on the surface of the electrode sheet.

TABLE 2

Weight and thickness of solid electrolyte formed in each electrode sheet

| Electrodes | Solid electrolyte | |
|---|---|---|
| | Thickness | Weight |
| Sulfur-based rubber positive electrode | 34 μm | 3.94 mg/cm$^2$ |
| SiO negative electrode | 42 μm | 3.79 mg/cm$^2$ |

<Preparation of all-Solid-State Battery>

A CR2032 type coin cell was prepared by combining the positive electrode sheet and the negative electrode sheet obtained above. Specifically, the sulfur-based positive electrode sheet and the SiO negative electrode sheet were layered in a manner such that the electrode layer surface of the positive electrode sheet and the electrode layer surface of the negative electrode sheet were opposed to each other, and cold pressing was carried out under 26 MPa using a uniaxial pressing machine. The obtained sheet was put into the CR2032 type coin cell, thereby preparing an all-solid-state battery.

<Charge and Discharge Test>

Figure 3:
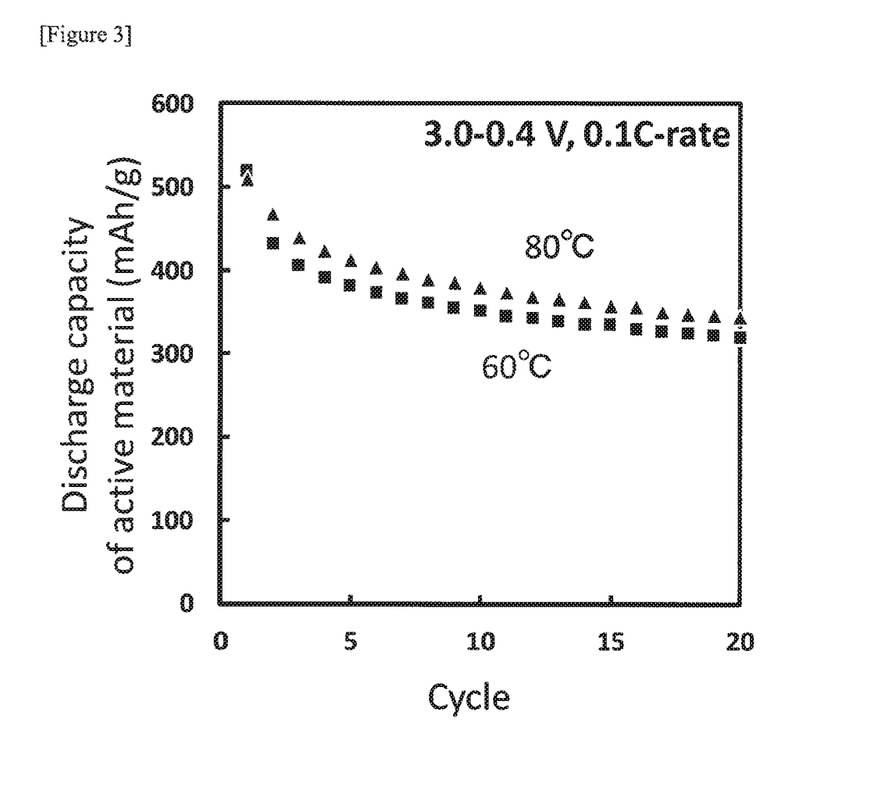
FIG. 3 shows cycle characteristics of the all-solid-state battery prepared in Example 2.

Using the obtained all-solid-state battery, a constant current charge and discharge test was conducted with environmental temperatures of 60° C. and 80° C., a charge/discharge current of 0.1C-rate and an operating voltage range of 0.4-3.0 V. Cycle characteristics obtained by plotting discharge capacities relative to respective cycles are shown in FIG. 3. It is understood from FIG. 3 that the prepared all-solid-state battery successfully performed charge/discharge stably during the charge and discharge test of 20 cycles.

EXPLANATIONS OF LETTERS OR NUMERALS 10 electrode sheet (positive electrode sheet)
11 current collector
12 positive electrode layer
13 solid electrolyte layer
20 electrode sheet (negative electrode sheet)
21 current collector
22 negative electrode layer
23 solid electrolyte layer

The invention claimed is:

1. A method for producing an all-solid-state battery having a solid electrolyte layer between a positive electrode layer and a negative electrode layer, the method comprising:
    coating or impregnating at least one of the positive electrode layer and the negative electrode layer with a solid electrolyte solution obtained by dissolving a boron hydride compound serving as a solid electrolyte in a solvent, wherein the obtained solution includes no undissolved boron hydride compound; and
    removing the solvent from the coated or impregnated solid electrolyte solution and causing the solid electrolyte to precipitate on at least one of the positive electrode layer and the negative electrode layer,
    wherein the solvent comprises at least one selected from the group consisting of tetrahydrofuran, 2-methyltetrahydrofuran, 1,2-dimethoxyethane, diethylene glycol dimethyl ether, propanenitrile, acetonitrile, N,N-dimethylformamide, and N,N-dimethylacetamide, and
    wherein the boron hydride compound consists of at least one selected from the group consisting of $LiBH_4$, a $LiBH_4$-LiI-based material, $3LiBH_4$—LiI, a $LiBH_4$—$P_2S_5$-based material, $9LiBH_4$—$P_2S_5$, a $LiBH_4$—$P_2I_4$-based material, $9LiBH_4$—$P_2I_4$, $85LiBH_4$-$15P_2I_4$, $Li_2B_{12}H_{12}$, $Li_2B_{10}H_{10}$, $LiCB_{11}H_{12}$, and $LiCB_9H_{10}$.

2. The method according to claim 1, wherein the causing of the solid electrolyte to precipitate comprises forming the solid electrolyte layer on at least one of the positive electrode layer and the negative electrode layer.

3. The method according to claim 2, which comprises forming at least one of the positive electrode layer and the negative electrode layer on which the solid electrolyte layer has been formed, without pressing.

4. The method according to claim 2, which comprises bonding the positive electrode layer to the negative electrode layer in a manner such that the solid electrolyte layer is positioned between the positive electrode layer and the negative electrode layer.

5. The method according to claim 4, wherein a pressing pressure during the bonding of the positive electrode layer to the negative electrode layer is 0.001 MPa to 10 MPa.

6. The method according to claim 4, wherein a pressing pressure during the bonding of the positive electrode layer to the negative electrode layer is 0.001 MPa to 2 MPa.

7. The method according to claim 1, which comprises further coating at least one of the positive electrode layer and the negative electrode layer on which the solid electrolyte is caused to precipitate with the solid electrolyte solution, removing the solvent from the solid electrolyte solution and forming the solid electrolyte layer on at least one of the positive electrode layer and the negative electrode layer.

8. The method according to claim 1, which comprises preparing the solid electrolyte layer by impregnating a support with the solid electrolyte solution and removing the solvent from the solid electrolyte solution.

9. The method according to claim 1, wherein the boron hydride compound consists of $LiBH_4$.

10. The method according to claim 1, wherein the solvent comprises at least one selected from the group consisting of tetrahydrofuran and acetonitrile.

11. The method according to claim 1, wherein the positive electrode layer contains a positive electrode active material, and wherein the electric potential of the positive electrode active material with reference to lithium is 3.0 V or less.

12. The method according to claim 1, wherein the positive electrode layer contains a sulfur-based positive electrode active material.

13. The method according to claim 1, wherein the negative electrode layer contains at least one selected from the group consisting of silicon, tin, a silicon-containing compound and a tin-containing compound as a negative electrode active material.

14. The method according to claim 13, wherein SiO is contained as the negative electrode active material.

15. A method for producing an all-solid-state battery having a solid electrolyte layer between a positive electrode layer and a negative electrode layer, the method comprising:
    coating or impregnating at least one of the positive electrode layer and the negative electrode layer with a molten salt obtained by melting a boron hydride compound having a melting point from 80° C. to 250° C. serving as a solid electrolyte; and
    cooling the molten salt and causing the solid electrolyte to precipitate on at least one of the positive electrode layer and the negative electrode layer.

* * * * *